Patented June 6, 1950

2,510,153

UNITED STATES PATENT OFFICE 2,510,153

DRILLING FLUIDS STABLE IN THE PRESENCE OF BRINES RICH IN POLYVALENT CATIONS

Richard W. Swinehart, Midland, Mich., assignor to The Dow Chemical Company, Midland, Mich., a corporation of Delaware No Drawing. Application February 26, 1949, Serial No. 78,672

4 Claims. (Cl. 252—8.5)

This invention relates to aqueous drilling fluids, commonly called muds, containing special agents to render them stable in the presence of brines rich in such polyvalent cations as calcium, magnesium, barium, strontium, iron, zinc, tin, and the like. (Many of these ions do not appear in natural subsurface brines, but may be found as contaminants in a drilling fluid.)

Among the problems associated with drilling the original hole for a deep well, as well as with subsequent drilling to increase the depth of an old well, is that of maintaining the quality of the aqueous drilling mud whose use is necessary in rotary drilling operations. Such a mud, which serves the multiple purposes of lubricating the ever-lengthening drill stem, coating the walls of the bore to minimize both water loss and sloughing of the earth formation, and carrying fresh cuttings from the rotary bit to the surface, must have a unique and reasonably constant set of properties throughout the drilling operation. Such properties as viscosity, density, water-retention in porous formations, and wall-building properties have all been subjects of many proposals in the prior art. To improve one or more of these properties of a drilling mud, many addition agents have been suggested. When it is possible to prepare a fresh water mud, and when no brine stratum is penetrated by the drilling operation, the prior art proposals have provided various satisfactory mud compositions.

The introduction of common salt (sodium chloride) brine into a drilling mud has presented a problem due to coagulation of the mud by the salt. To overcome this common problem, it has been proposed by Wagner, in U. S. Patent 2,425,768, to add to the mud a water-soluble alkali metal salt of carboxymethyl cellulose, to serve as a colloidal suspending or dispersing agent. Such salts of carboxymethyl cellulose protect the mud against coagulation, even in the presence of surprisingly high concentrations of sodium chloride, and they permit a mud which has become contaminated with sodium chloride to retain the desirable density and viscosity values and ability which it had before being contaminated to deposit thin sheaths on the bore wall without high water loss.

It has been noted, however, that the water-soluble salts of carboxymethyl cellulose do not protect a mud which becomes contaminated with brines containing calcium, ferrous, ferric or other polyvalent cations. The commonest such ion in subterranean brines is that of calcium, usually occurring as calcium chloride. The latter salt, and many other polyvalent metal salts, will cause precipitation of carboxymethyl cellulose from its solutions, and, whenever such a salt is brought into contact with a drilling mud containing carboxymethyl cellulose, the latter ceases to exert the desired protective action.

In many oil fields, calcium brine strata are penetrated before oil is reached. When old wells are to be deepened there is always the possibility that iron salts (from the action of brine or of acids on the old casing) may have accumulated in the well. Numerous opportunities exist for accidental contamination of a drilling mud with polyvalent cations during its preparation or in the mud pit. An agent is needed to protect a drilling mud against coagulation and loss of desirable properties when contaminated with polyvalent cations.

It is the principal object of the present invention to provide an aqueous well-drilling fluid which retains its desirable properties, not only in the presence of common salt, but also when contaminated with water-soluble calcium salts or other water-soluble salts having polyvalent cations. Another object is to provide a drilling mud composition which retains its usefulness when the bore hole penetrates a stratum producing calcium chloride brine. A further object is to provide a drilling mud which has been modified by the inclusion of a suspending or dispersing agent for the mud solids, which agent is not coagulated by the common polyvalent cationic contaminants of such muds. A particular object is to provide a drilling mud containing, as the protective agent, a water-soluble form of a mixed ether of cellulose having both methyl and carboxymethyl substituents in the same molecule.

As stated above, it is known that carboxymethyl cellulose is precipitated from solution by polyvalent cations, such as are present, for example, in calcium chloride brines, and, when so-precipitated, it is no longer an effective protective colloid or dispersant. It is also known that water-soluble methyl cellulose is coagulated by many salts containing either monovalent or polyvalent cations or anions, e. g., by sodium or calcium chlorides or sulfates, and that such methyl cellulose gels when its aqueous solutions are warmed to temperatures encountered in many subterranean bore holes. Hence, methyl cellulose is not useful for the purpose here concerned. Accordingly, it was surprising to discover that the foregoing and related objects may be attained without encountering the defects either of methyl cellulose or of carboxmethyl cellulose, by using instead, for each barrel (42

U. S. gallons) of mud, from 1 to 5 pounds of a cellulose ether containing in the same molecule from 0.1 to 0.5 carboxymethyl substituent and from about 0.65 to about 1.05 methyl substituents per average $C_6$ unit. Expressed another way, the double ether which is useful here contains from about 3.2 to about 15 per cent carboxymethyl groups and from 10 to about 18 per cent methoxyl groups in the makeup of a single average molecule. It is conventional to refer to the degree of substitution of a methyl cellulose in terms of the percentage of methoxyl groups present, and to define a carboxymethyl cellulose in terms of the average number of carboxymethyl groups present per $C_6$ unit. Hence, each of these two types of designation will be used with respect to the diverse substituents in the double ethers here employed. The useful product will be designated herein, for simplicity, as carboxymethyl methyl cellulose. This double ether of cellulose, in the form of its sodium salt, is soluble in water and is not coagulated in the presence of either monovalent or polyvalent anions or cations, and its solutions do not gel when heated to any temperature up to the boiling point of water. As will be shown hereinafter, the double ether is not, and does not behave like, a mere mixture of methyl cellulose and carboxymethyl cellulose.

In determining the relative efficacy of each dispersing agent tested and reported herein, the method and apparatus used were those prescribed in API Code No. 29, second edition, July 1942—"Recommended practice on standard field procedure for testing drilling fluids (tentative)"—copyright 1942 by American Petroleum Institute, New York city. These tests, and their usefulness in the practical evaluation of drilling muds, are discussed in the periodical "Drilling Mud," vol. 7, No. 1, May 1940, published by Baroid Sales Division, National Lead Company, 830 Ducommon St., Los Angeles, California, and in "Principles of Drilling Mud Control" issued by The University of Texas, Industrial and Business Extension Training Bureau, Austin, Texas (1947).

It would appear to be a necessary condition that a dispersing agent which can tolerate polyvalent metal salt solutions should also be substantially as effective in fresh water muds as are other dispersants now in use. It should also be at least as effective as the other useful dispersants in muds containing common salt brine (monovalent ions). The following Table 1 sets forth results which establish the utility of carboxymethyl methyl cellulose in fresh water mud and in a mud containing common salt.

Table 1

| Dispersant | Per Cent Methoxyl | Degree of Substitution Carboxymethyl | Pounds Per Barrel of Mud | Sodium Chloride in Water Phase, Per Cent | cc. water loss | | Mud Coating Thickness, 1/32 inch |
|---|---|---|---|---|---|---|---|
| | | | | | 7.5 min. | 30 min. | |
| A. Fresh Water Mud | | | | | | | |
| None | | | | trace | 29 | 60 | 8 |
| Sodium salt of carboxymethyl cellulose | | 0.81 | 1.91 | trace | 10.1 | 20.1 | 4 |
| Sodium salt of carboxymethyl methyl cellulose | 10.9 | 0.42 | 1.65 | trace | 6.0 | 11.5 | 1 |
| B. Salt Water Mud | | | | | | | |
| None | | | | 15.9 | 62.0 | 124.0 | 24 |
| Sodium salt of carboxymethyl cellulose | | 0.81 | 2 | 15.9 | 4.0 | 8.0 | 3 |
| Sodium salt of carboxymethyl methyl cellulose | 10.4 | 0.3 | 2 | 15.9 | 4.0 | 8.0 | 2— |
| Do | 16.1 | 0.1 | 2 | 15.9 | 4.0 | 8.0 | 3 |
| Do | 15.3 | 0.3 | 2 | 15.9 | 3.5 | 7.0 | 3— |
| Do | 10.9 | 0.42 | 2 | 15.9 | 4.0 | 8.0 | 2 |

It is seen from the foregoing table that, in both fresh and salt (sodium chloride) muds, the sodium salt of carboxymethyl methyl cellulose is as satisfactory as the sodium salt of carboxymethyl cellulose in preventing water loss and in the wall coating characteristics (as shown by filter cake thickness) of the treated mud. The viscosities and gel strengths of the various treated muds were all in the commonly accepted ranges, and are not reported here. As a result of the reported tests, the double ethers were deemed to have qualified for the more stringent test in a mud containing calcium chloride.

In the following Table 2 are set forth results of a number of comparative tests made with a mud in which the aqueous phase contained 6 per cent of calcium chloride, by weight, and the various tested dispersants were sodium salts of carboxymethyl cellulose and carboxymethyl methyl cellulose, as well as methyl cellulose and mixtures of methyl cellulose and carboxymethyl cellulose.

Table 2

| Dispersant | Per Cent Methoxyl | Degree of Substitution, Carboxymethyl | Pounds Per Barrel of Mud | Calcium Chloride in Water Phase, Per Cent | cc. water loss | | Mud Coating Thickness, 1/32 inch |
|---|---|---|---|---|---|---|---|
| | | | | | 7.5 min. | 30 min. | |
| None | | | | 0 | 107 | 214 | |
| Sodium salt of carboxymethyl cellulose | | 0.81 | 2 | 0 | 5.5 | 11.0 | 2 |
| Do | | 0.81 | 2 | 6 | 36 | 72 | 7 |
| Sodium salt of carboxymethyl methyl cellulose | 10.9 | 0.42 | 2 | 0 | 5.0 | 10.0 | 1+ |
| Do | 10.9 | 0.42 | 2 | 6 | 5.0 | 10.0 | 1+ |
| Methyl cellulose | 31.9 | | 2 | 0 | 44 | 87 | 8 |
| Do | 31.9 | | 2 | 6 | 39 | 78 | 3 |
| Mixture of methyl cellulose and sodium carboxymethyl cellulose | 31.9 | | 1 | 6 | 54 | 109 | 7 |
| | | 0.81 | 1 | | | | |

Table 2 shows that, of the various cellulose derivatives and mixtures of such derivatives tested, the only one which retains its effectiveness in preventing water loss in a mud containing calcium chloride brine is the double ether, carboxymethyl methyl cellulose. The double ether also furnishes the most consistently good wall building characteristics, forming thin impervious sheaths (or filter cakes) even in the presence of calcium chloride.

Table 3, which follows, establishes the degree of methylation and carboxymethylation which are necessary to give a double ether of the type discussed which will be satisfactory as a drilling mud additive in the presence of calcium brines. The dosage of the ether in the mud was 2 pounds per barrel in each case, and the mud contained 6 per cent of calcium chloride based on the weight of water present.

*Table 3*

| Per Cent Methoxyl | Degree of Substitution, Carboxymethyl | cc. Water Loss | | Remarks |
|---|---|---|---|---|
| | | 7.5 min. | 30 min. | |
| 28.3 | 0.06 | 20 (1 min.) | | No good. |
| 24.6 | 0.10 | 39 | 78 | Do. |
| 19.9 | 0.10 | 20 (1 min.) | | Do. |
| 16.1 | 0.15 | 4 | 8 | Excellent. |
| 16.0 | 0.12 | 6 | 12 | Do. |
| 12.0 | 0.30 | 7.5 | 15 | Very good. |
| 11.0 | 0.16 | 11 | 22 | Good. |
| 11.0 | 0.16 | 8 | 16 | Very good. |
| 10.9 | 0.42 | 5 | 10 | Excellent. |
| 10.4 | 0.20 | 4 | 8 | Do. |
| 8.8 | 0.30 | 56 | 112 | No good. |
| 7.0 | 0.33 | 100 | | Do. |

From the foregoing and other similar tests, it is clearly apparent that, to meet the requirements of a good mud dispersant where calcium brines are to be encountered, a carboxymethyl methyl cellulose must not have less than 10 nor more than 18 per cent methoxyl content, and, at the same time, it must contain at least 0.1 and not over 0.5 carboxymethyl substituent per $C_6$ unit (sometimes called "anhydroglucose") in the double ether of cellulose.

The amount of the defined cellulose ether to be employed may range from 1 to 5 pounds per barrel (42 U. S. gallons) of mud. Consistently satisfactory results are obtained with 2 to 3 pounds per barrel under the conditions most frequently encountered. It is not necessary that the cellulose ether employed be of a purified grade, as the crude product obtained directly from the etherification vessel in which it has been made may be used. In such case, the dosage is from 1 to 5 pounds of the contained salt of carboxymethyl methyl cellulose per barrel of mud.

The examples have illustrated the use of the sodium salt of the double ether of cellulose. Other water-soluble salts may be used, including the potassium, lithium, and ammonium salts, as may be aluminum salt which, though requiring mildly alkaline conditions when preparing its solutions, remains dissolved in neutral, acid and alkaline media. The salts which dissolve readily in water are the ones of primary interest and widest utility in the process, and, of these, the sodium salt is the most practical.

The herein-described double ethers of cellulose have been shown not to be adversely affected by calcium chloride solutions at 6 per cent concentration in a drilling mud. Naturally occurring calcium chloride brines may be encountered which have from 1 per cent or less to 20 per cent or more of calcium chloride, and the new mud compositions are useful even when diluted with such brines. Simple tests have shown these ethers to have a similar tolerance to various polyvalent ions commonly encountered in well drilling operations, including both the readily soluble and the difficultly soluble salts of magnesium, calcium, barium, iron and other common polyvalent metals. No adverse effect is noted with such diverse anions as chloride, bromide, sulfate, carbonate and silicate which are often encountered in brine or earth formations pierced by a well bore. Neither is the mud of the present invention affected by other potential contaminants containing polyvalent cations which may be introduced at the well head.

I claim:

1. An aqueous mud for use in drilling wells, having dissolved therein, for each barrel of mud, from 1 to 5 pounds of a salt of carboxymethyl methyl cellulose which is soluble in aqueous media, having both from 10 to 18 per cent methoxyl content and from 0.1 to 0.5 carboxymethyl substituent in the average $C_6$ unit of the cellulose molecule, said mud being characterized by its ability to form a thin filter cake having low water-loss values, and by its tolerance for brines containing polyvalent cations without loss of its cake-forming and water-retention properties.

2. An aqueous mud for use in drilling wells, having dissolved therein, for each barrel of mud, from 2 to 3 pounds of a water-soluble salt of carboxymethyl methyl cellulose having both from 10 to 18 per cent methoxyl content and from 0.1 to 0.5 carboxymethyl substituent in the average $C_6$ unit of the cellulose molecule, said mud being characterized by its ability to form a thin filter cake having low water-loss values, and by its tolerance for brines containing calcium ions without loss of its cake-forming and water-retention properties.

3. An aqueous mud for use in drilling wells, having dissolved therein, for each barrel of mud, from 1 to 5 pounds of the sodium salt of carboxymethyl methyl cellulose having both from 10 to 18 per cent methoxyl content and from 0.1 to 0.5 carboxymethyl substituent in the average $C_6$ unit of the cellulose molecule, said mud being characterized by its ability to form a thin filter cake having low water-loss values, and by its tolerance for brines containing polyvalent cations without loss of its cake-forming and water-retention properties.

4. An aqueous mud for use in drilling wells, having dissolved therein, for each barrel of mud, from 1 to 5 pounds of the aluminum salt of carboxymethyl methyl cellulose having both from 10 to 18 per cent methoxy content and from 0.1 to 0.5 carboxymethyl substituent in the average $C_6$ unit of the cellulose molecule, said mud being characterized by its ability to form a thin filter cake having low water-loss values, and by its tolerance for brines containing polyvalent cations without loss of its cake-forming and water-retention properties.

RICHARD W. SWINEHART.

REFERENCES CITED

The following references are of record in the file of this patent:

UNITED STATES PATENTS

| Number | Name | Date |
|---|---|---|
| 2,425,768 | Wagner | Aug. 19, 1947 |
| 2,481,545 | Wagner et al. | Sept. 13, 1949 |